United States Patent [19]

Vaughn

[11] 4,084,795
[45] Apr. 18, 1978

[54] APPARATUS FOR MANUFACTURING FOAMED PLASTICS

[76] Inventor: Daniel J. Vaughn, 73 Wildbriar Rd., Rochester, N.Y. 14623

[21] Appl. No.: 615,768

[22] Filed: Sep. 22, 1975

[51] Int. Cl.² .............................................. B01F 3/04
[52] U.S. Cl. .......................... 366/177; 261/DIG. 26; 425/205; 366/340
[58] Field of Search ................... 259/4 R, 4 A, 4 AB, 259/18, 36, 60, 95; 425/200, 205, 207; 261/78 A, DIG. 16, DIG. 26; 260/2.5 BC, 2.5 BD

[56] References Cited
U.S. PATENT DOCUMENTS

| | | | |
|---|---|---|---|
| 2,271,982 | 2/1942 | Van Kreveld | 259/95 |
| 2,673,723 | 3/1954 | Keen | 261/DIG. 26 |
| 3,105,745 | 10/1963 | Vieli | 261/DIG. 26 |
| 3,169,833 | 2/1965 | Breer | 259/4 R |
| 3,188,055 | 6/1965 | Lutjens | 259/4 R |
| 3,623,704 | 11/1971 | Skobel | 259/4 AB |
| 3,677,522 | 7/1972 | Hargash | 259/4 AB |
| 3,773,298 | 11/1973 | Gebert | 259/4 R |

FOREIGN PATENT DOCUMENTS 42,241 6/1933 France.

Primary Examiner—Harvey C. Hornsby
Assistant Examiner—Robert Pous
Attorney, Agent, or Firm—Shlesinger, Fitzsimmons & Shlesinger

[57] ABSTRACT

The apparatus comprises a foaming cylinder containing a foaming chamber into which a liquid foaming agent is discharged through a small orifice. The chamber is closed at one end by three, aligned discs having therethrough a plurality of axially extending openings which connect the foaming chamber to a venturi. Compressed air, which also enters the foaming chamber with the foaming agent, forces the liquid through the openings in the discs to the venturi section. The openings in the center disc are angularly offset from the openings in the two outer discs, so that the discs form a maze through which the foamed liquid passes from the foaming chamber to the venturi. The venturi feeds the foamed liquid to a mixing chamber into which a resin is introduced under pressure through a spinner and orifice so that the foamed liquid is completely mixed with the resin before being discharged as a foamed plastic.

8 Claims, 5 Drawing Figures

APPARATUS FOR MANUFACTURING FOAMED PLASTICS

This invention relates to apparatus for producing foamed plastics, and more particularly to improved apparatus for continuously mixing and dispensing a partially polymerized resin and a foaming agent, which thus produce a foamed plastic material.

Heretofore apparatus has been developed for continuously mixing a foaming agent, a catalyst and compressed air with a partially polymerized resin to produce a cured foam product. Such equipment, however, has been awkward and cumbersome in relation to its design weight, and has had a tendency to clog or back up rather easily, therefore requiring frequent and timecomsuming cleaning operations. Moreover, because such prior equipment has not been properly designed, portions of the foaming agent frequently are not converted into bubble structure, and consequently "wetting out" problems have occured in the resultant foamed products. With such prior equipment, therefore, it has been impossible to produce a foamed product having uniform density and cell structure. Usually such prior apparatus produces, for example, a 60% closed and a 40% open celled product.

Because a large portion of material produced by apparatus of the type described is used as thermal insulation, or for sound absorbing or deadening products, it is imperative that the density, the cell size and the structure of the final product be carefully controlled in order to achieve a satisfactory thermal conduitivity factor and good sound absorptive characteristics. Ideally such equipment would produce a product having 100% open cells (i.e., consisting substantially completely of cellular walls), thus allowing the material to breathe; yet the product should also be virtually impervious to molecular water.

A principal object of this invention, therefore, is to provide improved foaming apparatus of the type described which obviates the above-noted problems inherent in prior such apparatus, while at the same time producing a foamed product which approaches a 100% open celled structure.

Still another object of this invention is to provide improved apparatus of the type described which is capable of converting substantially all of the foaming agent, which is employed, into a bubble or foam structure, thereby obviating "wetting out" problems.

Another object of this invention is to provide improved apparatus of the type described which is readily adjustable to control the diameter of the holes or cells produced in the resultant foamed product.

It is an object also of this invention to provide apparatus of the type described which seldom becomes clogged or dirty, and consequently substantially eliminates most of the cleaning problems attendant on prior such apparatus.

Other objects of the invention will be apparent hereinafter from the specification and from the recital of the appended claims, particularly when read in conjunction with the accompanying drawing.

Figure 1:
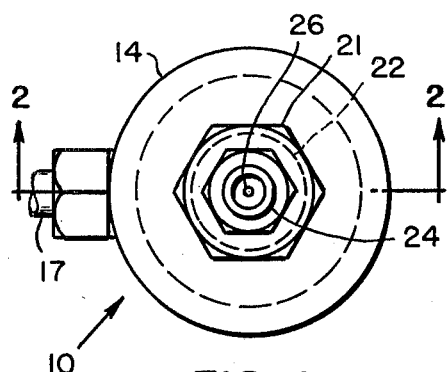
FIG. 1 is a fragmentary plan view of apparatus made according to one embodiment of this invention for producing foamed plastic.

Referring now to the drawing by numerals of reference, and first to FIGS. 1 to 3, 10 denotes generally a foaming unit or cylinder, the discharge of which is connected to a mixing cylinder which is denoted generally at 11. A resin supply cylinder, which is denoted generally at 12, also discharges into the mixing cylinder for a purpose noted hereinafter.

Foaming cylinder 10 comprises a head cap 14 having an axial bore the upper end of which is internally threaded as at 15. Below this threaded portion 15 the bore expands gradually to form an upper foaming chamber 16, which is generally truncatedconical in configuration. A tube 17 for supplying compressed air to the chamber 16 has a threaded end 18, which is secured in an internally threaded port or opening 19, which extends radially through cap 14 to open on chamber 16 just beneath the threaded portion 15.

A hollow plug 21, which is threaded intermediate its ends into the upper end 15 of the bore in the head cap 14, seals the upper end of chamber 16. The lower end 22 of plug 21 is generally hyperboloid in configuration, and projects coaxially downwardly into chamber 16 so that its outer, curved surface 23 is positioned opposite the port 19. A supply hose 24 for liquid foaming agent has a threaded end 25 secured in the upper end of plug 21, and communicates with the foaming chamber 16 through a small orifice 26, which is formed centrally in the lower, transverse end of plug 21.

The lower end of head cap 14 is threaded into the upper end of a sleeve 30, which contains three discshaped, coaxially disposed members 32, 33 and 34. Each of the members 32, 33 and 34 has therethrough a first set of equiangularly spaced, axially-extending openings 32-1, 33-1 and 34-1, respectively, the axes of which are equi-spaced radially a distance R-1 (FIG. 2) from the common axis of the members 32, 33 and 34. Each of these members also has therethrough a second plurality of equiangularly spaced, axially-extending openings 32-2, 33-2, and 34-2, respectively, the axes of which are equi-spaced radially a distance R-2 (FIG. 2) from the common axis of these members.

The lower ends of the openings 32-1 and 32-2 in member 32 open, respectively, on grooves 32-A and 32-B, which are formed concentrically in the bottom, plane surface of member 32 coaxially thereof. These grooves confront similarly shaped grooves 33A and 33B, respectively, which are formed concentrically in the upper surface of the member 33 to register, respectively, with the upper ends of the openings 33-1 and 33-2. The lower ends of opening 33-1 and 33-2 likewise register with similar grooves 33-A and 33-B, respectively, which are formed in the bottom of member 33 in registry with similar grooves 34-A and 34-B, respectively, which are formed in the upper end of member 34 in registry with the upper ends of its openings 34-1 and 34-2, respectively.

In the embodiment illustrated, each of the abovenoted grooves in members 32, 33 and 34 is arcuate (semi-cylindrical) in cross section, so that each confronting pair thereof forms a closed, circular path between the confronting ends of the disc members.

Figure 3:
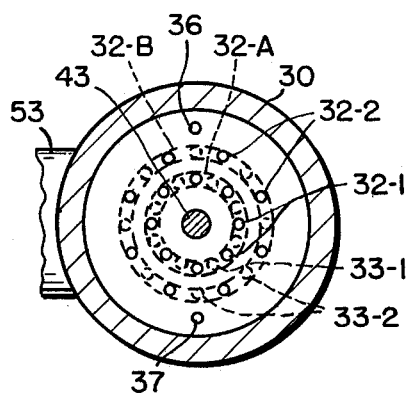
FIG. 3 is a fragmentary sectional view taken along the line 3—3 in FIG. 2 looking in the direction of the arrows.
Figure 2:
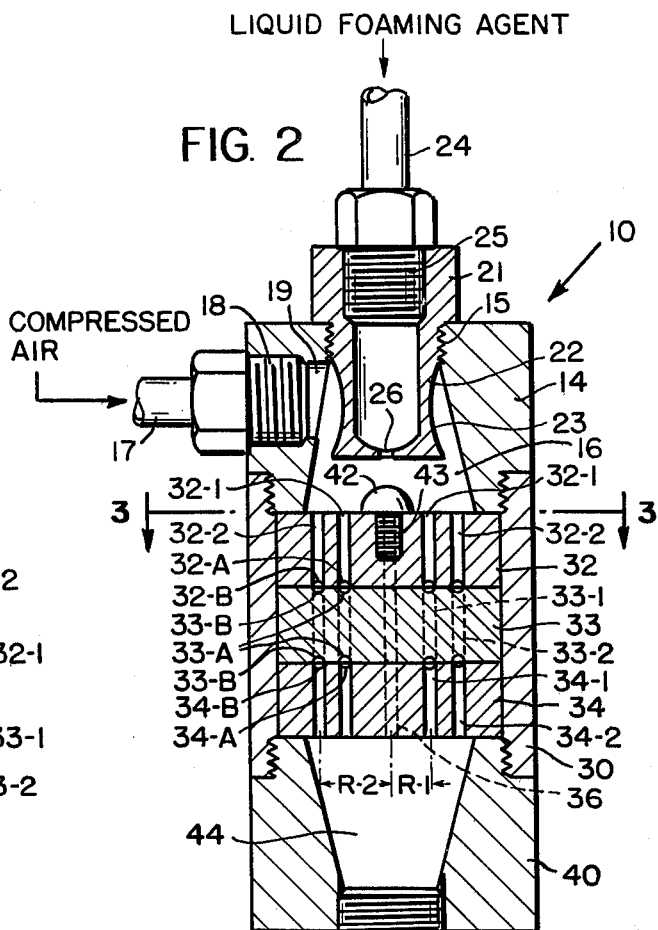
FIG. 2 is a fragmentary sectional view taken along the line 2—2 in FIG. 1 looking in the direction of the arrows, portions of the apparatus, however, being shown in full.

Although the spacing between openings in each of the members 32, 33 and 34 is identical, these members are assembled within the sleeve 30 so that the axial openings through the two outermost members 32 and 34 register vertically with one another, but the openings 33-1 and 33-2 in the intermediate member 33 are angularly offset with respect to the corresponding openings in the outer members 32 and 34 (FIGS. 2 and 3). The three members 32, 33 and 34 are secured in these relative positions by means of two, elongate lock pins 36 and 37 (FIG. 3), which extend through registering openings in members 32, 33 and 34 adjacent diametrally opposite sides thereof.

This disc asemmbly is secured coaxially in the bore of sleeve 30 by a cylindrical base section 40 (FIG. 2), which is threaded at its upper end into the lower end of sleeve 30 to engage the lowermost disc 34. A semi-spherically shaped splash pad 42, which has a shank portion 43 threaded into the top of the disc-member 32 coaxially thereof, projects into the lower end of the foaming chamber 16 in registry with the orifice 26 in plug 21. Also, the lower ends of the openings 34-1 and 34-2 in member 34 open on the upper end of an inverted, truncated conical bore 44, which is formed in the upper end of the base member 40 to form a combination venturi and lower foaming chamber in the foaming unit 10.

Threaded at its upper end into the bottom of the base member 40 to communicate with the chamber 44 is a nipple 46, the lower end of which is secured by a coupling sleeve 47 to the upper end of the mixing cylinder 11, so that the material passing through the foaming unit 10 will be discharged into the mixing cylinder 11 as noted hereinafter.

A tube 50 for supplying resin to the mixing cylinder 11 has a threaded end 51 (FIG. 2) which is secured in the internally threaded bore of a hollow plug 53, which has an externally threaded inner end 54 that is secured in a tubular branch 55 of the mixing cylinder 11. A small orifice 57, which is formed in the transverse, inner end of the plug 53 coaxially thereof, connects the bore of the plug with the bore in branch 55, and has an enlarged, frusto-conical inner end 56 facing the bore of mixing cylinder 11.

Mounted in the inner end 54 of plug 53 adjacent the orifice 56 is a cylindrically-shaped spinner, which has in opposite ends thereof diametrally extending grooves 61 and 62, one of which extends at right angles relative to the other. In its outer surface the spinner 60 has formed therein two, spaced, helical, axially extending grooves 64 and 65, one of which communicates at its upper or left end as shown in FIG. 2 with one end of groove 61, and the other of which communicates at its upper end with the opposite end of groove 61. Similarly at the lower end of the spinner 60, the lower terminal ends of the grooves 64 and 65 communicate with opposite ends, respectively, of the groove 62.

In use, a liquid foaming agent, such an an alkyl aryl sulfonate or sulfonic acid type, is fed through the hose 24, at the same time that a metered compressed air supply is connected to hose 17. The orifice 26 in the hollow plug 21 allows proper metering of the foaming agent entering the head. The foaming agent injected under pressure through the orifice 26 strikes the splash pad 42, which disperses the agent evenly onto the surface of disc 32. At the same time, the compressed air entering the port 19 helps to force the foaming agent downwardly through the openings 32-1, 32-2 in the upper disc member 32. The diameters of these openings and those of the openings 33-1, 33-2, 34-1 and 34-2, have a direct effect upon the size of the bubbles entering chamber 44, and a proportionately direct effect on the size of the bubble structure which is formed in the finished, foamed product.

As the partially foamed liquid leaves the lower ends of the opening 32-1 and 32-2 in the upper disc 32, it enters the two, concentric, circular paths, which are formed by the confronting grooves 32-A, 33-A and 32-B, 33-B, respectively. The openings 33-1 and 33-2 in the intermediate disc are angularly offset from those in the two outermost discs, so that the liquid discharged from the bottoms of the openings in the disc 32 must travel angularly about the axis of the foaming unit 10 until it reaches the upper ends of the openings 33-1 and 33-2 in the intermediate disc. The liquid then travels downwardly through the openings in disc 33 and into the two, concentrically disposed circular paths defined between the discs 33 and 34 by the confronting grooves 33-A, 34-A and 33-B, 34-B. Again the liquid must travel angularly in these grooves until it reaches the upper ends of the openings 34-1 and 34-2 in the lowermost disc 34. After passing through these last-named openings, the now-substantially-completely-foamed liquid enters the lower foaming chamber 44, which defines a venturi which discharges the foamed liquid into the upper end of the mixing cylinder 11. The inside diameter of cylinder 11 is larger than the diameter of the nipple 46, which is threaded into the throat of the lower mixing chamber or venturi 44, so that upon entering the mixing cylinder 11, the foamed liquid expands.

At this time a partially polymerized resin, such as for example urea formaldehde or a melamine, thermosetting resin, is fed through the hose 50, and the metering orifice 57 in the inner end of the hollow plug 53, into mixing cylinder 11 at an angle to the path that the foamed liquid enters the upper end of cylinder 11. The conically shaped inner end 56 of the orifice 57 functions to spread the resin into a cone-shaped pattern as it enters cylinder 11, while the spinner 60 imparts a swirling motion to the resin as it is sprayed onto the foam in cylinder 11 in such manner as to prevent any foamed liquid from passing through the cylinder 11 without being coated with the resin.

It should be noted that the spinner 60 does not rotate within the lower end of the hollow plug 53, but causes the incoming resin to split up into two different helical grooves 64 and 65, which extend from the upper to the lower end of the spinner. Part of the incoming resin, therefore, swirls downwardly around the outside of the spinner in one groove, while another portion of the resin swirls downwardly around the outside of the spinner in the other groove.

From the point at which the resin supply enters the mixing chamber 11, the mixed resin and foam pass through the lower end of the mixing cylinder to a delivery tube 70 (FIG. 2), which may vary in length, for example, from 6 feet to 10 feet, depending upon the particular application. The foam is directed by this hose to its destination, where it can be dispensed by a nozzle, or the like.

With apparatus of the type described, it has been determined that the size of the cells in the end product can be controlled by varying the diameters of the axial openings 32-1, 32-2, etc. in the several disc members 32, 33 and 34. This diameter may range, for example, from 0.0625 in. to 0.25 in., with a diameter of approximately 0.111 in. being particularly suitable to produce a foamed plastic having an exceptionally good thermal conductivity factor.

Moreover, foamed plastic produced with this apparatus has exhibited a 98% to 100% open cell structure having an angle of capillary contact larger than 90% (dupre Equation-Ref: dymes per/cm.) thus making the foam virtually impervious to molecular water. When the foam was submerged under water for 24 hours at room temperature, it absorbed water in an amount less than 1.8% by weight. This excellent open cell structure is attribual to the fact that the foaming unit 10, for example, causes substantially all of the liquid foaming agent to be converted into bubble or foam structure, before entering the mixing cylinder 11, thus producing a foamed product having a more uniform density and cell size, and substantially eliminating the wetting out problem heretofore experienced when using known foaming apparatus.

From the foregoing it will be apparent that the instant apparatus provides a very economical and reliable means for producing improved foamed plastics of the type described. In addition to producing a more uniformly and thoroughly foamed product, the apparatus is relatively simple to manufacture and assemble or disassemble. Still another advantage is the fact that the venturi created by the lower mixing chamber 40 causes a positive pressure to be exerted forwardly into the upper end of the mixing cylinder 11, thus preventing the material in cylinder 11 from backing up into the foaming unit 10. This feature, when combined with the throttling effect afforded by the maze created by the disc members 32, 33 and 34, stablizes the flow of the foaming agent through the unit 10, and also prevents any undesirable back-up or clogging of the unit, which was a problem inherent in known apparatus.

For example, with prior apparatus any sudden increase or decrease in the quantity of the foamed mixture discharged from the apparatus, for example, from the hose 70, would tend to cause the catalyzed product in the mixing cylinder 11 to back up into the foaming unit 10, and would result in undesirable clogging of the unit. No such problems are encountered with applicant's apparatus and consequently the shut-down time of the apparatus for cleaning or replacement purposes is minimized.

After the apparatus has been used, it can be cleaned simply by first shutting off the foaming agent and resin supplies, and allowing compressed air to enter through port 19 until the chamber 16 and conduits defined by the openings in discs 32, 33 and 34 have been cleaned. Moreover, to change the ultimare cell size in the finished product, the discs 32–34 may be replaced by other discs in which the diameters of the openings 32-1, 31-2, etc. are either larger or smaller, as desired.

Figures 4, 5:
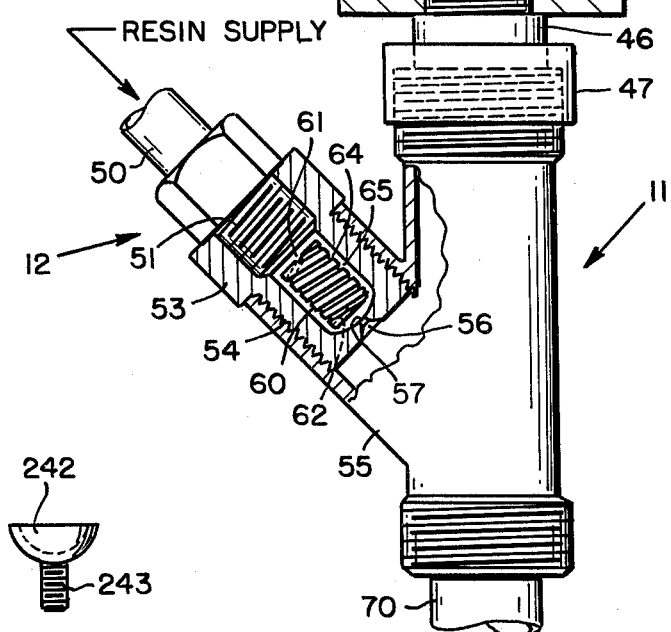
FIG. 4 is an elevational view of a modified form of splash pad which can be employed in this apparatus.
FIG. 5 is an elevational view of still another form of splash pad which may be used with this apparatus.

FIGS. 4 and 5 illustrate modified forms of splash pads or plates which can be substituted for the pad 42 shown in FIG. 2.

The splash pad of FIG. 4 has a generally conical, curvalinear head 142, and an integral, threaded shank 143, by means of which the pad can be secured in the upper end of disc 32. The pad illustrated in FIG. 5 comprises a generally cup-shaped head 242, which also has a threaded shank 243 by means of which it can be secured in palce of pad 42 in the disc 32, if desired. Both of these modified splash pads function to distribute the incoming liquid foaming agent uniformly onto the upper surface of disc 32, in the manner similar to that of the pad 42.

While this invention has been illustrated and described in connection with certain embodiments thereof, it is apparent that it is capable of still further modification, and this application is intended to cover any such modifications which may fall within the scope of one skilled in the art or the appended claims.

Having thus described my invention What I claim is:

1. Apparatus for producing a cellular, foamed plastic from a mixture of synthetic resin and a liquid foaming agent, comprising
    means defining a pair of spaced chambers,
    a plurality of perforated plates extending transversely across one of said chambers intermediate the ends thereof,
    means for supplying a liquid foaming agent to one end of said one chamber for passage through said plates to the opposite end of said one chamber, and to be converted during passage through said plates into a foam having a predetermined bubble structure,
    means connecting said chambers to convey foamed liquid from said one to the other of said chambers,
    means for feeding a synthetic resin to said other chamber for mixture therein with the foamed liquid from said one chamber, and
    means for dispensing the mixture of resin and foamed liquid from said other chamber,
    each of said plates having therethrough a plurality of spaced, parallel openings that are angularly offset from the openings in the adjacent plate, and
    the confronting surfaces of said plates having therein grooves, which connect the openings in each plate with the offset openings in the adjacent plate, whereby the interconnected, offset openings in said plates define a plurality of spaced conduits through which the liquid foaming agent passes from said one end of said one chamber to the opposite end thereof.

2. Apparatus as defined in claim 1, wherein said connecting means includes
    a venturi positioned at said opposite end of said one chamber between said perforated plates and said other chamber to resist back-flow of foamed liquid from said other chamber to said plates,
    said venturi having a truncated-conical section the larger end of which faces said plates, and the smaller end of which is connected to said other chamber by a conduit which is smaller in diameter than said other chamber.

3. Apparatus as defined in claim 1, wherein
    said means for supplying a liquid foaming agent comprises an orifice located in said one end of said one chamber and through which said liquid agent is discharged into said one chamber,
    a splash pad is secured in said one chamber opposite said orifice to be struck by the liquid discharged from said orifice, and to distribute the liquid uniformly onto the ends of said conduits which open on said one end of said one chamber, and
    said one chamber has a port in said one end thereof for supplying compressed air to said one chamber to force the liquid foaming agent through said conduits of said other chamber.

4. Apparatus as defined in claim 3, wherein said one end of said one chamber is generally truncated-conical in configuration, a hollow fitting projects into the smaller end of said truncated-conical end of said one chamber coaxially thereof and in its inner end has a small opening facing said splash pad and defining said orifice, the portion of said fitting projecting into said truncated-conical end of said one chamber is generally hyperboloid in configuration, and said port is disposed to direct compressed air onto said projecting portion in a direction radially thereof.

5. Apparatus as defined in claim 3, wherein said pad has a semipherically-shaped head facing said orifice and disposed coaxially thereof.

6. Apparatus as defined in claim 3, wherein said pad has a cup-shaped head facing said orifice and disposed coaxially thereof.

7. Apparatus as defined in claim 3, wherein said pad has a pointed, curvilinear head facing said orifice and disposed coaxially thereof.

8. Apparatus for producing a cellular, foamed plastic from a mixture of a synthetic resin and a liquid foaming agent, comprising means defining a pair of spaced chambers, means for supplying a liquid foaming agent to one of the chambers to be converted therein into a foam having a predetermined bubble structure, means connecting said chambers to convey foamed liquid from said one to the other of said chambers, means for feeding a synthetic resin to said other chamber for mixture therein with the foamed liquid from said one chamber, and means for dispensing the mixture of resin and foamed liquid from said other chamber, said one chamber comprising a tubular member having therein a plurality of discs secured in the bore of said tubular member coaxially thereof, each of said discs having therethrough a plurality of spaced, axially-extending openings that are angularly offset from the openings in the adjacent disc, and the confronting surfaces of said discs having therein grooves, which connect the openings in one disc with the offset openings in the adjacent disc, whereby the interconnected, offset openings in said discs define a plurality of spaced conduits through which the liquid foaming agent passes during its travel from said one to said other chamber, said connecting means including a venturi positioned between said discs and said other chamber to resist back-flow of foamed liquid from said other chamber to said discs, and said venturi having a truncated-conical section the larger end of which faces said discs, and the smaller end of which is connected to said other chamber by a conduit which is smaller in diameter than said other chamber.

* * * * *